(12) United States Patent
Miyake et al.

(10) Patent No.: US 9,969,915 B2
(45) Date of Patent: May 15, 2018

(54) URETHANE RESIN COMPOSITION, COATING AGENT, AND ARTICLE

(71) Applicant: DIC Corporation, Tokyo (JP)

(72) Inventors: Junichi Miyake, Osaka (JP); Hiroyoshi Kannari, Osaka (JP); Jun Shirakami, Osaka (JP)

(73) Assignee: DIC CORPORATION, Tokyo (JP)

( * ) Notice: Subject to any disclaimer, the term of this patent is extended or adjusted under 35 U.S.C. 154(b) by 119 days.

(21) Appl. No.: 14/781,010

(22) PCT Filed: Feb. 25, 2014

(86) PCT No.: PCT/JP2014/054440
§ 371 (c)(1),
(2) Date: Sep. 28, 2015

(87) PCT Pub. No.: WO2014/156423
PCT Pub. Date: Oct. 2, 2014

(65) Prior Publication Data
US 2016/0053146 A1    Feb. 25, 2016

(30) Foreign Application Priority Data

Mar. 29, 2013    (JP) ................. 2013-072534

(51) Int. Cl.
| | | |
|---|---|---|
| C08F 299/06 | (2006.01) |
| C08G 18/08 | (2006.01) |
| C08G 18/12 | (2006.01) |
| C08G 18/44 | (2006.01) |
| C08G 18/67 | (2006.01) |
| C08L 75/14 | (2006.01) |
| C09D 5/02 | (2006.01) |
| C09D 175/06 | (2006.01) |
| C09D 175/14 | (2006.01) |
| C09D 175/16 | (2006.01) |
| C09J 175/06 | (2006.01) |

(52) U.S. Cl.
CPC ........... *C09J 175/06* (2013.01); *C08F 299/06* (2013.01); *C08G 18/0823* (2013.01); *C08G 18/12* (2013.01); *C08G 18/44* (2013.01); *C08G 18/67* (2013.01); *C08G 18/672* (2013.01); *C08G 18/673* (2013.01); *C08L 75/14* (2013.01); *C09D 5/02* (2013.01); *C09D 175/06* (2013.01); *C09D 175/14* (2013.01); *C09D 175/16* (2013.01)

(58) Field of Classification Search
CPC ...... C09J 175/06; C08G 18/67; C08G 18/672; C08G 18/673; C08G 18/0823; C08G 18/12; C08G 18/44; C08L 75/14; C09D 5/02; C09D 175/14; C09D 175/16; C09D 175/06; C08F 299/06
See application file for complete search history.

(56) References Cited

U.S. PATENT DOCUMENTS

| | | | |
|---|---|---|---|
| 4,399,239 A | 8/1983 | Herwig et al. | |
| 5,384,380 A | 1/1995 | Kanesaki et al. | |
| 2004/0198868 A1* | 10/2004 | Tielemans | C09D 11/101 523/161 |
| 2005/0079447 A1 | 4/2005 | Uegaki et al. | |

FOREIGN PATENT DOCUMENTS

| | | |
|---|---|---|
| JP | 57-87419 A | 5/1982 |
| JP | 57-165422 A | 10/1982 |
| JP | 06-211960 A | 8/1994 |
| JP | 2002-173597 A | 6/2002 |
| JP | 2008-534710 A | 8/2008 |
| JP | 2011-026369 A | 2/2011 |

OTHER PUBLICATIONS

Notification of Reasons for Refusal Japanese Patent Application No. 2014-551857 dated Jan. 29, 2015 with English translation.
International Search Report PCT/JP2014/054440 dated May 13, 2014 with English translation.

* cited by examiner

*Primary Examiner* — Patrick D Niland
(74) *Attorney, Agent, or Firm* — McDermott Will & Emery LLP

(57) ABSTRACT

The present invention provides a urethane resin composition containing a urethane resin having polymerizable unsaturated groups and an aqueous medium. The urethane resin is obtained by reacting a polyol with a polyisocyanate. The polyol contains an alkylenediol having two or more polymerizable unsaturated groups or an oxyalkylenediol having two or more polymerizable unsaturated groups. The alkylenediol is represented by general formula (1):

$$\text{HO—R}^1\text{—OH} \qquad (1)$$

(where $R^1$ is a linear alkylene group of one to nine carbon atoms having two or more atomic groups containing a polymerizable unsaturated group in side chains thereof). The oxyalkylenediol (a1-2) is represented by general formula (2):

$$\text{HO—R}^1\text{O—R}^2\text{—OR}^3\text{—OH} \qquad (2)$$

(where $R^1$ and $R^3$ are ethylene groups having a total of two or more atomic groups containing a polymerizable unsaturated group in side chains thereof, and $R^2$ is an alkylene group of one to five carbon atoms). This urethane resin composition can form a coating with good elongation and flexibility and high hardness.

5 Claims, No Drawings

URETHANE RESIN COMPOSITION, COATING AGENT, AND ARTICLE

CROSS-REFERENCE TO RELATED APPLICATIONS

This Application is the U.S. National Phase of PCT/JP2014/054440 filed Feb. 25, 2014, which claims priority to Japanese Patent Application No. 2013-072534 filed Mar. 29, 2013. The subject matter of each is incorporated herein by reference in entirety.

TECHNICAL FIELD

The present invention relates to urethane resin compositions that can be used for various applications such as coating agents and adhesives.

BACKGROUND ART

Urethane resin compositions are used for various applications such as coating agents and adhesives since they generally have good adhesion to substrates and can form a soft coating.

One known urethane resin composition, for example, is a water-based polyurethane dispersion obtained by reacting a mixture containing a) at least one organic aliphatic, alicyclic, or aromatic di-, tri-, or polyisocyanate; b) at least one isocyanate-reactive polycarbonate diol, triol, or polyol; c) at least one compound having at least one isocyanate-reactive group and at least one unsaturated group polymerizable by free radicals; d) at least one compound having at least one isocyanate-reactive group and at least one dispersing group; and optionally e) at least one compound having at least two isocyanate-reactive groups and having a molecular weight of less than 1,000 g/mol, preferably less than 500 g/mol, and then dispersing the resulting reaction product in water (see, for example, PTL 1).

Research has been directed to the use of urethane resin compositions for applications such as surface coatings on optical components, including those for flexible displays. Unfortunately, a coating formed from the above water-based polyurethane dispersion has insufficient softness, e.g., insufficient elongation and flexibility, and may exhibit defects such as whitening when the coated article is bent. The coating formed from the above water-based polyurethane dispersion also has insufficient hardness and is susceptible to scratches, for example, when used as a surface coating on a touch panel, which may result in problems such as poor appearance.

CITATION LIST

Patent Literature

PTL 1: Japanese Unexamined Patent Application Publication (Translation of PCT Application) No. 2008-534710

SUMMARY OF INVENTION

Technical Problem

An object of the present invention is to provide a urethane resin composition that can form a coating with good elongation and flexibility and high hardness.

Solution to Problem

The inventors have found that the foregoing object can be achieved by the use of a particular alkylenediol (a1-1) of one to five carbon atoms containing two or more polymerizable unsaturated groups as a polyol in the production of urethane resin.

Specifically, the present invention relates to a urethane resin composition containing a urethane resin (A) having polymerizable unsaturated groups and an aqueous medium (B). The urethane resin (A) is obtained by reacting a polyol (a1) with a polyisocyanate (a2). The polyol (a1) contains an alkylenediol (a1-1) having two or more polymerizable unsaturated groups or an oxyalkylenediol (a1-2) having two or more polymerizable unsaturated groups. The alkylenediol (a1-1) is represented by general formula (1):

[Chem. 1]

$$HO-R^1-OH \quad (1)$$

(where $R^1$ is a linear alkylene group of one to nine carbon atoms having two or more atomic groups containing a polymerizable unsaturated group in side chains thereof). The oxyalkylenediol (a1-2) is represented by general formula (2):

[Chem. 2]

$$HO-R^1O-R^2-OR^3-OH \quad (2)$$

(where $R^1$ and $R^3$ are ethylene groups having a total of two or more atomic groups containing a polymerizable unsaturated group in side chains thereof, and $R^2$ is an alkylene group of one to five carbon atoms).

Advantageous Effects of Invention

The urethane resin composition according to the present invention can form a coating with good elongation and flexibility and high hardness. This urethane resin composition is suitable for use as a coating agent or adhesive for plastic substrates such as acrylonitrile-butadiene-styrene (ABS) resin, polycarbonate (PC) resin, ABS/PC resin, polystyrene (PS) resin, polymethacrylate (PMMA) resin, and polyester (PET) resin substrates.

DESCRIPTION OF EMBODIMENTS

A urethane resin composition according to the present invention contains a urethane resin (A) having polymerizable unsaturated groups and an aqueous medium (B). The urethane resin (A) is obtained by reacting a polyol (a1) with a polyisocyanate (a2). The polyol (a1) contains an alkylenediol (a1-1) having two or more polymerizable unsaturated groups and represented by general formula (1) below or an oxyalkylenediol (a1-2) having two or more polymerizable unsaturated groups and represented by general formula (2) below.

The urethane resin (A) has polymerizable unsaturated groups and is obtained by reacting the polyol (a1) with the polyisocyanate (a2). The polyol (a1) contains the alkylenediol (a1-1) having two or more polymerizable unsaturated groups or the oxyalkylenediol (a1-2) having two or more polymerizable unsaturated groups. The alkylenediol (a1-1) is represented by general formula (1):

[Chem. 3]

$$HO-R^1-OH \quad (1)$$

(where $R^1$ is a linear alkylene group of one to nine carbon atoms having two or more atomic groups containing a polymerizable unsaturated group in side chains thereof).

The oxyalkylenediol (a1-2) is represented by general formula (2):

[Chem. 4]

$$HO-R^1O-R^2-OR^3-OH \qquad (2)$$

(where $R^1$ and $R^3$ are ethylene groups having a total of two or more atomic groups containing a polymerizable unsaturated group in side chains thereof, and $R^2$ is an alkylene group of one to five carbon atoms).

The polyol (a1), which contains the alkylenediol (a1-1) having two or more polymerizable unsaturated groups and represented by general formula (1) or the oxyalkylenediol (a1-2) having two or more polymerizable unsaturated groups and represented by general formula (2), is used in the production of the urethane resin (A) to introduce two or more polymerizable unsaturated groups into the side chains on the main chain, where urethane bonds are mainly present, of the urethane resin (A). The polymerizable unsaturated groups derived from the alkylenediol (a1-1) or the oxyalkylenediol (a1-2) undergo radical polymerization, for example, during the formation of a coating. This provides a coating with good elongation and flexibility and high hardness.

The alkylenediol (a1-1) may be an alkylenediol represented by general formula (1). In general formula (1), $R^1$ is a linear alkylene group of one to nine carbon atoms having two or more atomic groups containing a polymerizable unsaturated group in side chains thereof. For example, pentaerythritol di(meth)acrylate is represented by general formula (1) where $R^1$ is an alkylene group of three carbon atoms, i.e., a propylene group, having two atomic groups containing a polymerizable unsaturated group in side chains thereof.

The alkylenediol (a1-1) preferably has two to five polymerizable unsaturated groups, more preferably two or three polymerizable unsaturated groups, to provide a urethane resin composition that can form a coating with good elongation and flexibility and high hardness.

Examples of alkylenediols (a1-1) include pentaerythritol di(meth)acrylate (dimethylolpropane di(meth)acrylate), dimethylolmethane di(meth)acrylate (in general formula (1), $R^1$ has three carbon atoms and two atomic groups containing a polymerizable unsaturated group), diethylolmethane di(meth)acrylate, diethylolpropane di(meth)acrylate (in general formula (1), $R^1$ has five carbon atoms and two atomic groups containing a polymerizable unsaturated group), dipropanolmethane di(meth)acrylate, dipropanolpropane di(meth)acrylate (in general formula (1), $R^1$ has seven carbon atoms and two atomic groups containing a polymerizable unsaturated group), dibutanolmethane di(meth)acrylate, and dibutanolpropane di(meth)acrylate (in general formula (1), $R^1$ has nine carbon atoms and two atomic groups containing a polymerizable unsaturated group). Pentaerythritol di(meth)acrylate and dimethylolmethane di(meth)acrylate are preferred to provide a urethane resin composition that can form a coating with good elongation and flexibility and high hardness.

The oxyalkylenediol (a1-2) may be an oxyalkylenediol represented by general formula (2). In general formula (2), $R^1$ and $R^3$ are ethylene groups having atomic groups containing a polymerizable unsaturated group in side chains thereof. The ethylene groups in general formula (2) have a total of two or more atomic groups containing a polymerizable unsaturated group, preferably a total of two to five atomic groups containing a polymerizable unsaturated group, more preferably a total of two or three atomic groups containing a polymerizable unsaturated group, in side chains thereof.

In general formula (2), $R^2$ is an alkylene group of one to five carbon atoms. Examples of such alkylene groups include methylene, ethylene, propylene, butylene, and pentyl.

Examples of oxyalkylenediols (a1-2) include bis(3-acryloyloxy-2-hydroxyproxy)methane (in general formula (2), $R^1$ has two carbon atoms, $R^2$ has one carbon atom, $R^3$ has two carbon atoms, and there are two atomic groups containing a polymerizable unsaturated group), 1,2-bis(3-acryloyloxy-2-hydroxyproxy)ethane (in general formula (2), $R^1$ has two carbon atoms, $R^2$ has two carbon atoms, $R^3$ has two carbon atoms, and there are two atomic groups containing a polymerizable unsaturated group), 1,3-bis(3-acryloyloxy-2-hydroxyproxy)propane (in general formula (2), $R^1$ has two carbon atoms, $R^2$ has three carbon atoms, $R^3$ has two carbon atoms, and there are two atomic groups containing a polymerizable unsaturated group), 1,4-bis(3-acryloyloxy-2-hydroxyproxy)butane (in general formula (2), $R^1$ has two carbon atoms, $R^2$ has four carbon atoms, $R^3$ has two carbon atoms, and there are two atomic groups containing a polymerizable unsaturated group), and 1,5-bis(3-acryloyloxy-2-hydroxyproxy)pentane (in general formula (2), $R^1$ has two carbon atoms, $R^2$ has five carbon atoms, $R^3$ has two carbon atoms, and there are two atomic groups containing a polymerizable unsaturated group).

The alkylenediol (a1-1) and the oxyalkylenediol (a1-2) are preferably present in a total amount of 0.1% to 49%, more preferably 1% to 15%, of the total mass of the ingredients used to produce the urethane resin (A) to provide a urethane resin composition that can form a coating with good elongation and flexibility and high hardness. The phrase "the total mass of the ingredients used to produce the urethane resin (A)" refers to the total mass of the polyol (a1), the polyisocyanate (a2), and if present, a chain extender.

The alkylenediol (a1-1) and the oxyalkylenediol (a1-2) may optionally be used in combination with other polyols as polyols (a1) that can be used in the production of the urethane resin (A).

Examples of other polyols include polyols having a hydrophilic group, which provide good dispersibility in water for the urethane resin (A).

Examples of polyols having a hydrophilic group include polyols having an anionic group, polyols having a cationic group, and polyols having a nonionic group. Polyols having an anionic group are preferred.

Examples of polyols having an anionic group include polyols having a carboxyl group and polyols having a sulfonic acid group.

Examples of polyols having a carboxyl group include 2,2-dimethylolpropionic acid, 2,2-dimethylolbutanoic acid, and 2,2-dimethylolvaleric acid, of which 2,2-dimethylolpropionic acid is preferred. Polyester polyols having a carboxyl group can also be used, which are obtained by reacting polyols having a carboxyl group with various polycarboxylic acids.

Examples of polyols having a sulfonic acid group include dicarboxylic acids such as 5-sulfoisophthalic acid, sulfoterephthalic acid, 4-sulfophthalic acid, and 5-(4-sulfophenoxy)isophthalic acid and salts thereof; polyester polyols obtained by reacting such dicarboxylic acids with low-molecular-weight polyols such as ethylene glycol, propylene glycol, 1,4-butanediol, 1,6-hexanediol, diethylene glycol, and neopentyl glycol; and polyester polyols obtained by reacting such polyester polyols with cyclic esters such as γ-butyrolactone, δ-valerolactone, and ε-caprolactone.

To provide good dispersibility in water, some or all of the anionic groups are preferably neutralized, for example, with basic compounds.

Examples of basic compounds that can be used to neutralize the anionic groups include organic amines having a boiling point of 200° C. or higher, such as ammonia, triethylamine, morpholine, monoethanolamine, and diethylethanolamine; and metal hydroxides such as sodium hydroxide, potassium hydroxide, and lithium hydroxide. To improve the dispersibility of the resulting urethane resin composition in water, such basic compounds are preferably used such that the molar ratio of the basic compound to all acidic groups, such as carboxyl, is 0.5 to 3, more preferably 0.7 to 1.5.

Examples of polyols having a cationic group include polyols having a tertiary amino group, such as N-methyldiethanolamine and polyols obtained by reacting compounds having two epoxy groups with secondary amines.

Some or all of the cationic groups are preferably neutralized with acidic compounds such as formic acid, acetic acid, propionic acid, succinic acid, glutaric acid, tartaric acid, adipic acid, and phosphoric acid.

Some or all of the tertiary amino groups, which are cationic groups, are preferably quaternized. Examples of quaternizing agents include dimethyl sulfate, diethyl sulfate, methyl chloride, and ethyl chloride, preferably dimethyl sulfate.

Examples of polyols having a nonionic group include polyalkylene glycols having structural units derived from ethylene oxide.

Such polyols having a hydrophilic group are preferably present in an amount of 1% to 20%, more preferably 1% to 10%, of the total mass of the ingredients used to produce the urethane resin (A).

As such other polyols (a1), for example, polyester polyols, polycarbonate polyols, and polyether polyols can be used to form a coating with better elongation and flexibility and higher hardness. Polyester polyols and polycarbonate polyols are preferred.

Examples of polyester polyols include polyester polyols obtained by reacting low-molecular-weight polyols with polycarboxylic acids; polyester polyols obtained by the ring-opening polymerization reaction of cyclic esters such as ε-caprolactone; and copolymers thereof.

Examples of low-molecular-weight polyols include aliphatic polyols having molecular weights of about 50 to 300, such as ethylene glycol, propylene glycol, 1,4-butanediol, 1,6-hexanediol, diethylene glycol, neopentyl glycol, and 1,3-butanediol; alicyclic polyols such as cyclohexanedimethanol; and aromatic polyols such as bisphenol A and bisphenol F. Particularly preferred are 1,6-hexanediol and neopentyl glycol.

Examples of polycarboxylic acids that can be used in the production of polyester polyols include aliphatic polycarboxylic acids such as succinic acid, adipic acid, sebacic acid, and dodecanedicarboxylic acid; aromatic polycarboxylic acids such as terephthalic acid, isophthalic acid, phthalic acid, and naphthalenedicarboxylic acid; and anhydrides and esters thereof.

Examples of polycarbonate polyols include those obtained by reacting diols such as 1,4-butanediol, 1,5-pentanediol, 1,6-hexanediol, and cyclohexanedimethanol with carbonates such as dimethyl carbonate and diethyl carbonate and other compounds such as phosgene.

Such polyester polyols, polyether polyols, and polycarbonate polyols are preferably present in an amount of 1% to 70%, more preferably 15% to 45%, of the total mass of the ingredients used to produce the urethane resin (A) to form a coating with better elongation and flexibility and higher hardness.

Examples of polyisocyanates (a2) for use in the production of the urethane resin (A) include alicyclic polyisocyanates such as cyclohexane diisocyanate, dicyclohexylmethane diisocyanate, and isophorone diisocyanate; aromatic polyisocyanates such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; and aliphatic polyisocyanates such as hexamethylene diisocyanate, lysine diisocyanate, xylylene diisocyanate, and tetramethylxylylene diisocyanate. In particular, dicyclohexylmethane diisocyanate and isophorone diisocyanate are preferred as the polyisocyanate (a2) to form a coating with good elongation and flexibility and high hardness.

The polyol (a1) may be reacted with the polyisocyanate (a2) to produce the urethane resin (A), for example, by mixing the polyol (a1) and the polyisocyanate (a2) without a solvent or in an organic solvent and then reacting the mixture at a reaction temperature of about 50° C. to 150° C.

The polyol (a1) is preferably reacted with the polyisocyanate (a2), for example, such that the equivalent ratio of isocyanate groups from the polyisocyanate (a2) to hydroxyl groups from the polyol (a1) is 0.8 to 2.5, more preferably 0.9 to 1.5.

In addition to the polyol (a1) and the polyisocyanate (a2), a chain extender may optionally be used in the production of the urethane resin (A) to form a coating with better elongation and flexibility and higher hardness.

Examples of chain extenders that can be used in the production of the urethane resin (A) include polyamines, hydrazines, and other active-hydrogen containing compounds.

Examples of polyamines include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; and other polyamines such as N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, and triethylenetetramine.

Examples of hydrazines include hydrazine, N,N'-dimethylhydrazine, 1,6-hexamethylenebishydrazine, succinic acid dihydrazide, adipic acid dihydrazide, glutaric acid dihydrazide, sebacic acid dihydrazide, isophthalic acid dihydrazide, and β-semicarbazidopropionic acid hydrazide.

Examples of other active-hydrogen containing compounds include glycols such as ethylene glycol, diethylene glycol, triethylene glycol, propylene glycol, 1,3-propanediol, 1,3-butanediol, 1,4-butanediol, hexamethylene glycol, sucrose, methylene glycol, glycerol, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. These compounds can be used alone or in combination provided that they do not decrease the storage stability of the urethane resin composition according to the present invention.

Examples of organic solvents that can be used in the production of the urethane resin (A) include ketones such as acetone and methyl ethyl ketone; ethers such as tetrahydrofuran and dioxane; acetates such as ethyl acetate and butyl acetate; nitriles such as acetonitrile; and amides such as dimethylformamide and N-methylpyrrolidone. These organic solvents can be used alone or in combination. If an organic solvent is used in the production of the urethane resin (A), the organic solvent, if necessary, is preferably removed by processes such as distillation during or after the production of the urethane resin (A), for example, to reduce its environmental impact.

The thus-obtained urethane resin (A) preferably has a weight average molecular weight of 10,000 to 500,000, more preferably 20,000 to 200,000, even more preferably 40,000 to 100,000, to form a coating with better elongation and flexibility and higher hardness.

The urethane resin (A) preferably has urea bonds to form a coating with better elongation and flexibility and higher hardness.

The urethane resin (A) preferably has a urea bond equivalent of 500 to 50,000 to form a coating with better elongation and flexibility and higher hardness.

For example, if the thus-obtained urethane resin (A) has hydrophilic groups, the urethane resin (A) may be dissolved or dispersed in the aqueous medium (B) to produce the urethane resin composition according to the present invention by neutralizing some or all of the hydrophilic groups and then mixing the neutralized product with the aqueous medium (B).

Examples of aqueous media (B) include water, water-miscible organic solvents, and mixtures thereof. Examples of water-miscible organic solvents include alcohols such as methanol, ethanol, n-propanol, and isopropanol; ketones such as acetone and methyl ethyl ketone; polyalkylene glycols such as ethylene glycol, diethylene glycol, and propylene glycol; alkyl ethers of polyalkylene glycols; and lactams such as N-methyl-2-pyrrolidone. In the present invention, it is possible to use water alone, a mixture of water with a water-miscible organic solvent, or a water-miscible organic solvent alone. For reasons of safety and environmental impact, it is preferred to use water alone or a mixture of water with a water-miscible organic solvent, more preferably water alone.

In the thus-obtained urethane resin composition according to the present invention, the urethane resin (A) is preferably present in an amount of 5% to 85%, more preferably 15% to 50%, of the total mass of the urethane resin composition. In the thus-obtained urethane resin composition according to the present invention, the aqueous medium (B) is preferably present in an amount of 10% to 90%, more preferably 45% to 80%, of the total mass of the urethane resin composition.

The urethane resin composition preferably contains a polymerization initiator for inducing radical polymerization of the polymerizable unsaturated groups of the urethane resin (A).

Examples of polymerization initiators include benzophenone, benzil, Michler's ketone, thioxanthone, anthraquinone, benzoin, dialkoxyacetophenones, acyloxime esters, benzil ketals, hydroxyalkylphenones, and halogenoketones. These photopolymerization initiators may optionally be used in combination with tertiary amines such as methylamine, diethanolamine, N-methyldiethanolamine, and tributylamine.

Other examples of polymerization initiators include thermal polymerization initiators such as 2,2'-azobis(2-methylpropionamidine)dihydrochloride, 4,4'-azobis(4-cyano)valeric acid, 2,2'-azobis(2-amidinopropane)dihydrochloride, and peroxides such as benzoyl peroxide, t-butyl hydroperoxide, and hydrogen peroxide.

The polymerization initiator is preferably present in an amount of 0.5% to 5% by mass, on a solids basis, of the urethane resin (A).

The urethane resin composition may optionally contain additives. Examples of additives include compounds having a polymerizable unsaturated group, coating aids, fillers, thixotropic agents, tackifiers, pigments, and antimicrobial agents. These additives can be used provided that they do not interfere with the object of the present invention.

Examples of compounds having a polymerizable unsaturated group include dipentaerythritol hexa(meth)acrylate. Such compounds can be used to provide a urethane resin composition that can form a harder coating.

Examples of coating aids include anionic surfactants (e.g., dioctyl sodium sulfosuccinate), hydrophobic nonionic surfactants (e.g., sorbitan monooleate), and silicone oil.

Examples of thixotropic agents include fillers surface-treated with compounds such as fatty acids, fatty acid metal salts, fatty acid esters, paraffin, resin acids, surfactants, and polyacrylic acid; polyvinyl chloride powder; hydrogenated castor oil; fine silica powder; organic bentonite; and sepiolite.

Examples of pigments include commonly known and used inorganic pigments and organic pigments.

Examples of inorganic pigments include titanium oxide, antimony red, iron oxide red, cadmium red, cadmium yellow, cobalt blue, Prussian blue, ultramarine blue, carbon black, and graphite.

Examples of organic pigments include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, and azo pigments. Two or more of these pigments can be used in combination. These pigments may be surface-treated to have self-dispersibility in aqueous media.

Examples of antimicrobial agents include silver chloride, tolylfluanid, dichlofluanid, fluorofolpet, zinc pyrithione, methyl 2-benzimidazolecarboxylate, and 2-(4-thiazolyl)benzimidazole.

Other examples of additives include various additives such as reaction accelerators (e.g., metal reaction accelerators, metal salt reaction accelerators, and amine reaction accelerators), stabilizers (e.g., UV absorbers, antioxidants, and heat stabilizers), moisture scavengers (e.g., 4-p-toluenesulfonyl isocyanate), adsorbents (e.g., quicklime, hydrated lime, zeolite, and molecular sieves), adhesion promoters, defoaming agents, and leveling agents.

The urethane resin composition according to the present invention is suitable, for example, for use as a coating agent that can protect the surfaces of various substrates and improve their design.

Examples of substrates that can be coated with the coating agent to form a coating include glass substrates, metal substrates, plastic substrates, paper, wood substrates, and fibrous substrates. Porous substrates such as urethane foam substrates can also be used.

Examples of plastic substrates include polycarbonate substrates, polyester substrates, acrylonitrile-butadiene-styrene substrates, polyacrylic substrates, polystyrene substrates, polyurethane substrates, epoxy resin substrates, polyvinyl chloride substrates, and polyamide substrates.

Examples of metal substrates include coated steel sheets such as galvanized steel sheets and aluminum-zinc alloy-coated steel sheets, iron sheets, aluminum sheets, aluminum alloy sheets, electrical steel sheets, copper sheets, and stainless steel sheets.

The substrate may be a flat or curved substrate made of such a material as described above or may be a fibrous substrate such as nonwoven fabric.

The coating agent according to the present invention can be used to form a coating, for example, as follows. The coating agent is applied directly to the surface of the substrate or, for example, to a primer layer formed thereon in advance. After drying, the radical polymerization of the polymerizable unsaturated double-bond groups of the urethane resin (A) is induced.

Alternatively, a coating formed from the coating agent can be laminated on the surface of the desired substrate as follows. The coating agent is applied to a release sheet and is then dried and cured to form a coating on the surface of the release sheet. After an adhesive is applied to the coating, it is laminated on a fibrous substrate such as nonwoven fabric, and the release sheet is removed therefrom.

The coating agent may be applied to the substrate by processes such as spraying, curtain coating, flow coating, roller coating, brush coating, and dipping.

The coating agent may be cured by heating or irradiation with actinic radiation such as UV radiation.

The coating may be heated, for example, at about 100° C. to 150° C. for about 10 to 30 minutes to cure the coating through radical polymerization, although they vary depending on the type of radical polymerization initiator used.

For example, if the actinic radiation used for the irradiation of the coating is UV radiation, known lamps may be used, such as xenon lamps, xenon-mercury lamps, metal halide lamps, high-pressure mercury lamps, low-pressure mercury lamps, and LED lamps.

The coating is preferably irradiated with actinic radiation at a dose of 50 to 5,000 mJ/cm$^2$, more preferably 100 to 3,000 mJ/cm$^2$, even more preferably 100 to 1,000 mJ/cm$^2$. The UV dose is measured in the wavelength range of 300 to 390 nm using a UVR-N1 UV checker (Japan Storage Battery Co. Ltd.).

The coating agent can be used to form coatings with various thicknesses depending on, for example, the application of the substrate. Coatings with thicknesses of about 0.1 to 100 µm are generally preferred.

Articles having coatings formed on substrates using the coating agent as described above can be used as optical components such as those for liquid crystal displays and flexible displays, various plastic products such as cellular phones and household electric appliances, and metal products such as automotive exterior parts and building materials.

EXAMPLES

The present invention is further illustrated by the following examples and comparative examples.

Example 1

In a 2 L four-necked flask equipped with a heater, a stirrer, a thermometer, and a reflux condenser were placed 89.9 parts by mass of methyl ethyl ketone, 90 parts by mass of a polycarbonate polyol (polycarbonate polyol obtained by reacting 1,6-hexanediol and 1,5-pentanediol with diethyl carbonate, number average molecular weight=2,000), 12.2 parts by mass of 2,2-dimethylolpropionic acid, 11.8 parts by mass of 1,6-hexanediol, 20.1 parts by mass of pentaerythritol diacrylate (in general formula (1), R$^1$ has three carbon atoms and two atomic groups containing a polymerizable unsaturated group), 0.004 part by mass of methylhydroquinone, and 0.04 part by mass of 2,6-tert-butyl-p-cresol. The mixture was adjusted to 50° C. with stirring.

To the four-necked flask was added 97 parts by mass of dicyclohexylmethane diisocyanate. After the mixture was reacted at 80° C. for about 5 hours, 64.2 parts by mass of methyl ethyl ketone was added, and the mixture was cooled to 50° C. After cooling, 9.2 parts by mass of triethylamine was added, and 572.6 parts by mass of ion exchange water was added dropwise.

To the four-necked flask was added as a chain extender 28.7 parts by mass of a 10% by mass aqueous solution of piperazine. After the mixture was reacted, the solvent was removed under reduced pressure to obtain Urethane Resin Composition (I) with a nonvolatile content of 33% by mass.

Example 2

In a 2 L four-necked flask equipped with a heater, a stirrer, a thermometer, and a reflux condenser were placed 49.9 parts by mass of methyl ethyl ketone, 50 parts by mass of a polycarbonate polyol (polycarbonate polyol obtained by reacting 1,6-hexanediol and 1,5-pentanediol with diethyl carbonate, number average molecular weight=2,000), 6.8 parts by mass of 2,2-dimethylolpropionic acid, 6.6 parts by mass of 1,6-hexanediol, 11.2 parts by mass of pentaerythritol diacrylate (in general formula (1), R$^1$ has three carbon atoms and two atomic groups containing a polymerizable unsaturated group), 0.0022 part by mass of methylhydroquinone, and 0.022 part by mass of 2,6-tert-butyl-p-cresol. The mixture was adjusted to 50° C. with stirring.

To the four-necked flask was added 53.9 parts by mass of dicyclohexylmethane diisocyanate. After the mixture was reacted at 80° C. for about 5 hours, 35.7 parts by mass of methyl ethyl ketone was added, and the mixture was cooled to 50° C. After cooling, 12.8 parts by mass of dipentaerythritol hexaacrylate and 5.1 parts by mass of triethylamine were added, and 318.1 parts by mass of ion exchange water was added dropwise.

To the four-necked flask was added as a chain extender 16 parts by mass of a 10% by mass aqueous solution of piperazine. After the mixture was reacted, the solvent was removed under reduced pressure to obtain Urethane Resin Composition (II) with a nonvolatile content of 33% by mass.

Example 3

In a 2 L four-necked flask equipped with a heater, a stirrer, a thermometer, and a reflux condenser were placed 89.1 parts by mass of methyl ethyl ketone, 90 parts by mass of a polyester polyol obtained by reacting 1,6-hexanediol and neopentyl glycol with adipic acid (number average molecular weight=2,000), 12 parts by mass of 2,2-dimethylolpropionic acid, 11.7 parts by mass of 1,6-hexanediol, 19.8 parts by mass of pentaerythritol diacrylate (in general formula (1), R$^1$ has three carbon atoms and two atomic groups containing a polymerizable unsaturated group), 0.004 part by mass of methylhydroquinone, and 0.04 part by mass of 2,6-tert-butyl-p-cresol. The mixture was adjusted to 50° C. with stirring.

To the four-necked flask was added 95.6 parts by mass of dicyclohexylmethane diisocyanate. After the mixture was reacted at 80° C. for about 5 hours, 63.6 parts by mass of methyl ethyl ketone was added, and the mixture was cooled to 50° C. After cooling, 9.1 parts by mass of triethylamine was added, and 567.8 parts by mass of ion exchange water was added dropwise.

To the four-necked flask was added as a chain extender 28.3 parts by mass of a 10% by mass aqueous solution of piperazine. After the mixture was reacted, the solvent was removed under reduced pressure to obtain Urethane Resin Composition (III) with a nonvolatile content of 33% by mass.

Example 4

In a 2 L four-necked flask equipped with a heater, a stirrer, a thermometer, and a reflux condenser were placed 58.6 parts by mass of methyl ethyl ketone, 40 parts by mass of a polycarbonate polyol (polycarbonate polyol obtained by reacting 1,6-hexanediol and 1,5-pentanediol with diethyl carbonate, number average molecular weight=2,000), 5.2 parts by mass of 2,2-dimethylolpropionic acid, 2.8 parts by mass of 1,6-hexanediol, 22 parts by mass of pentaerythritol diacrylate (in general formula (1), $R^1$ has three carbon atoms and two atomic groups containing a polymerizable unsaturated group), 0.005 part by mass of methylhydroquinone, and 0.05 part by mass of 2,6-tert-butyl-p-cresol. The mixture was adjusted to 50° C. with stirring.

To the four-necked flask was added 49.8 parts by mass of dicyclohexylmethane diisocyanate. After the mixture was reacted at 80° C. for about 5 hours, 41.8 parts by mass of methyl ethyl ketone was added, and the mixture was cooled to 50° C. After cooling, 12.1 parts by mass of dipentaerythritol hexaacrylate and 5.3 parts by mass of triethylamine were added, and 373.7 parts by mass of ion exchange water was added dropwise.

To the four-necked flask was added as a chain extender 14.7 parts by mass of a 10% by mass aqueous solution of piperazine. After the mixture was reacted, the solvent was removed under reduced pressure to obtain Urethane Resin Composition (IV) with a nonvolatile content of 33% by mass.

Example 5

In a 2 L four-necked flask equipped with a heater, a stirrer, a thermometer, and a reflux condenser were placed 35.6 parts by mass of 1,4-bis(3-acryloyloxy-2-hydroxyproxy) butane (in general formula (2), $R^1$ has two carbon atoms, $R^2$ has four carbon atoms, $R^3$ has two carbon atoms, and there are two atomic groups containing a polymerizable unsaturated group), 0.007 part by mass of methylhydroquinone, and 0.07 part by mass of 2,6-tert-butyl-p-cresol. The mixture was adjusted to 50° C. with stirring.

To the four-necked flask was added 107.8 parts by mass of dicyclohexylmethane diisocyanate. After the mixture was reacted at 80° C. for about 3 hours, 103.9 parts by mass of methyl ethyl ketone, 100 parts by mass of a polyester polyol obtained by reacting 1,6-hexanediol and neopentyl glycol with adipic acid (number average molecular weight=2,000), 13.6 parts by mass of 2,2-dimethylolpropionic acid, and 10.2 parts by mass of 1,6-hexanediol were added. The mixture was reacted at 80° C. for about 3 hours.

To the four-necked flask was added 74.1 parts by mass of methyl ethyl ketone, and the mixture was cooled to 50° C. The mixture was adjusted to 50° C. with stirring. After cooling, 10.2 parts by mass of triethylamine was added, and 663 parts by mass of ion exchange water was added dropwise.

To the four-necked flask was added as a chain extender 31.9 parts by mass of a 10% by mass aqueous solution of piperazine. After the mixture was reacted, the solvent was removed under reduced pressure to obtain Urethane Resin Composition (V) with a nonvolatile content of 33% by mass.

Example 6

In a 2 L four-necked flask equipped with a heater, a stirrer, a thermometer, and a reflux condenser were placed 35.6 parts by mass of 1,4-bis(3-acryloyloxy-2-hydroxyproxy) butane (in general formula (2), $R^1$ has two carbon atoms, $R^2$ has four carbon atoms, $R^3$ has two carbon atoms, and there are two atomic groups containing a polymerizable unsaturated group), 0.007 part by mass of methylhydroquinone, and 0.07 part by mass of 2,6-tert-butyl-p-cresol. The mixture was adjusted to 50° C. with stirring.

To the four-necked flask was added 107.8 parts by mass of dicyclohexylmethane diisocyanate. After the mixture was reacted at 80° C. for about 3 hours, 103.9 parts by mass of methyl ethyl ketone, 100 parts by mass of a polyester polyol obtained by reacting 1,6-hexanediol and neopentyl glycol with adipic acid (number average molecular weight=2,000), 13.6 parts by mass of 2,2-dimethylolpropionic acid, and 10.2 parts by mass of 1,6-hexanediol were added. The mixture was reacted at 80° C. for about 3 hours.

To the four-necked flask was added 74.1 parts by mass of methyl ethyl ketone, and the mixture was cooled to 50° C. The mixture was adjusted to 50° C. with stirring. After cooling, 27 parts by mass of dipentaerythritol hexaacrylate and 10.2 parts by mass of triethylamine were added, and 663.0 parts by mass of ion exchange water was added dropwise.

To the four-necked flask was added as a chain extender 31.9 parts by mass of a 10% by mass aqueous solution of piperazine. After the mixture was reacted, the solvent was removed under reduced pressure to obtain Urethane Resin Composition (VI) with a nonvolatile content of 33% by mass.

Comparative Example 1

In a nitrogen-purged vessel equipped with a thermometer, a nitrogen gas inlet tube, and a stirrer, 100 parts by mass of a polyester polyol obtained by reacting 1,6-hexanediol and neopentyl glycol with adipic acid (number average molecular weight=2,000), 10.6 parts by mass of 1,6-hexanediol, 13.4 parts by mass of 2,2-dimethylolpropionic acid, and 106.3 parts by mass of dicyclohexylmethane diisocyanate were mixed with 98 parts by mass of methyl ethyl ketone. The mixture was reacted in the reaction vessel at 80° C. to obtain an organic solvent solution of a urethane prepolymer having isocyanate groups at the ends thereof.

The organic solvent solution of the urethane prepolymer was mixed with 21.9 parts by mass of 2-hydroxyethyl acrylate, 0.003 part by mass of methylhydroquinone, and 0.03 part by mass of 2,6-tert-butyl-p-cresol. The mixture was reacted in the reaction vessel at 80° C. to obtain an organic solvent solution of a urethane resin having isocyanate groups at the ends of the main chain thereof and polymerizable unsaturated bonds in the side chains thereof.

After the organic solvent solution of the urethane resin was mixed with 10 parts by mass of dimethylethanolamine, 624.6 parts by mass of water was added, and the mixture was sufficiently stirred. To the mixture was added 31.5 parts by mass of a 10% by mass aqueous solution of piperazine to perform a chain extension reaction. The reaction mixture was distilled under reduced pressure to obtain Urethane Resin Composition (I') with a nonvolatile content of 33% by mass.

Comparative Example 2

In a nitrogen-purged vessel equipped with a thermometer, a nitrogen gas inlet tube, and a stirrer, 100 parts by mass of a polyester polyol obtained by reacting 1,6-hexanediol and neopentyl glycol with adipic acid (number average molecular weight=2,000), 21.2 parts by mass of 1,6-hexanediol, 13.9 parts by mass of 2,2-dimethylolpropionic acid, and 106.3 parts by mass of dicyclohexylmethane diisocyanate were mixed with 93.8 parts by mass of methyl ethyl ketone. The mixture was reacted in the reaction vessel at 80° C. to obtain an organic solvent solution of a urethane prepolymer having isocyanate groups at the ends thereof.

The organic solvent solution of the urethane prepolymer was mixed with 17.5 parts by mass of pentaerythritol triacrylate, 0.003 part by mass of methylhydroquinone, and 0.03 part by mass of 2,6-tert-butyl-p-cresol. The mixture was reacted in the reaction vessel at 80° C. to obtain an organic solvent solution of a urethane resin having isocyanate groups at the ends of the main chain thereof and polymerizable unsaturated bonds in the side chains thereof.

After the organic solvent solution of the urethane resin was mixed with 10 parts by mass of dimethylethanolamine, 641.4 parts by mass of water was added, and the mixture was sufficiently stirred. To the mixture was added 31.5 parts by mass of a 10% by mass aqueous solution of piperazine to perform a chain extension reaction. The reaction mixture was distilled under reduced pressure to obtain Urethane Resin Composition (II') with a nonvolatile content of 33% by mass.

Comparative Example 3

In a 2 L four-necked flask equipped with a heater, a stirrer, a thermometer, and a reflux condenser were placed 73.4 parts by mass of an adduct of bisphenol A diglycidyl ether with acrylic acid (in general formula (2), $R^1$ has two carbon atoms, $R^2$ has 15 carbon atoms, $R^3$ has two carbon atoms, and there are two atomic groups containing a polymerizable unsaturated group), 0.015 part by mass of methylhydroquinone, and 0.15 part by mass of 2,6-tert-butyl-p-cresol. The mixture was adjusted to 50° C. with stirring.

To the four-necked flask was added 122.6 parts by mass of dicyclohexylmethane diisocyanate. After the mixture was reacted at 80° C. for about 3 hours, 124.3 parts by mass of methyl ethyl ketone, 100 parts by mass of a polyester polyol obtained by reacting 1,6-hexanediol and neopentyl glycol with adipic acid (number average molecular weight=2,000), 15.4 parts by mass of 2,2-dimethylolpropionic acid, and 8.2 parts by mass of 1,6-hexanediol were added. The mixture was reacted at 80° C. for about 3 hours.

To the four-necked flask was added 88.6 parts by mass of methyl ethyl ketone, and the mixture was cooled to 50° C. The mixture was adjusted to 50° C. with stirring. After cooling, 11.6 parts by mass of triethylamine was added, and 794.9 parts by mass of ion exchange water was added dropwise.

To the four-necked flask was added as a chain extender 36.3 parts by mass of a 10% by mass aqueous solution of piperazine. After the mixture was reacted, the solvent was removed under reduced pressure to obtain Urethane Resin Composition (III') with a nonvolatile content of 33% by mass.

Comparative Example 4

In a 2 L four-necked flask equipped with a heater, a stirrer, a thermometer, and a reflux condenser were placed 212 parts by mass of an adduct of bisphenol A diglycidyl ether with acrylic acid (in general formula (2), $R^1$ has two carbon atoms, $R^2$ has 15 carbon atoms, $R^3$ has two carbon atoms, and there are two atomic groups containing a polymerizable unsaturated group), 0.04 part by mass of methylhydroquinone, and 0.4 part by mass of 2,6-tert-butyl-p-cresol. The mixture was adjusted to 50° C. with stirring.

To the four-necked flask was added 369.1 parts by mass of dicyclohexylmethane diisocyanate. After the mixture was reacted at 80° C. for about 3 hours, 234.5 parts by mass of methyl ethyl ketone, 100 parts by mass of a polyester polyol obtained by reacting 1,6-hexanediol and neopentyl glycol with adipic acid (number average molecular weight=2,000), and 29.9 parts by mass of 2,2-dimethylolpropionic acid were added. The mixture was reacted at 80° C. for about 3 hours.

To the four-necked flask was added 287.9 parts by mass of methyl ethyl ketone, and the mixture was cooled to 50° C. The mixture was adjusted to 50° C. with stirring. After cooling, 38.9 parts by mass of triethylamine was added, and 2580.2 parts by mass of ion exchange water was added dropwise.

To the four-necked flask was added as a chain extender 65 parts by mass of a 10% by mass aqueous solution of piperazine. After the mixture was reacted, the solvent was removed under reduced pressure to obtain Urethane Resin Composition (IV') with a nonvolatile content of 33% by mass.

Method for Evaluation of Coating Elongation

A photopolymerization initiator (mixture of 1-hydroxycyclohexyl phenyl ketone and benzophenone) was added to each of the urethane resin compositions obtained in the examples and the comparative examples in an amount of 4 parts by mass per 100 parts by mass of the urethane resin present in the urethane resin composition. The urethane resin compositions were each applied to a thickness of 50 μm on a surface of a release film. The coating was dried at 25° C. for 24 hours and was then irradiated with UV radiation at a dose of 500 mJ/cm$^2$ in one pass using a high-pressure mercury lamp (GS Yuasa Corporation). The release film was removed to obtain a test film made of the urethane resin (4 cm long and 5 mm wide).

The test film was evaluated for elongation based on measurement results from a tensile test (tensile rate=50 mm/min) according to the following criteria:

Very good: The length of the test film after the tensile test was larger than that of the test film before the tensile test by not less than 100%.

Good: The length of the test film after the tensile test was larger than that of the test film before the tensile test by not less than 50% but less than 100%.

Fair: The length of the test film after the tensile test was larger than that of the test film before the tensile test by not less than 30% but less than 50%.

Poor: The length of the test film after the tensile test was larger than that of the test film before the tensile test by not less than 10% but less than 30%.

Very poor: The length of the test film after the tensile test was larger than that of the test film before the tensile test by less than 10%.

Method for Evaluation of Coating Flexibility

A photopolymerization initiator (mixture of 1-hydroxycyclohexyl phenyl ketone and benzophenone) was added to each of the urethane resin compositions obtained in the examples and the comparative examples in an amount of 4 parts by mass per 100 parts by mass of the urethane resin present in the urethane resin composition. The urethane resin compositions were each applied to a thickness of 2 μm on a surface of a metal sheet (untreated steel sheet with a thickness of 0.8 mm). The coating was dried at 100° C. for 30 seconds and was then irradiated with UV radiation at a dose of 500 mJ/cm$^2$ in one pass using a high-pressure mercury lamp (GS Yuasa Corporation). The release film was removed to obtain an article having a coating on the surface of the metal sheet.

The coating on the article was evaluated for flexibility based on measurement results from a flexibility test according to JIS K-5600-5-1 (mandrel diameter=2 mm) according to the following criteria:

Good: No crack, wrinkle, or whitening was found in the bent portion of the coating.

Fair: A slight crack or white streak was found in the bent portion of the coating.

Poor: A noticeable crack was found over the entire bent portion of the coating.

Method for Evaluation of Coating Hardness

A photopolymerization initiator (mixture of 1-hydroxycyclohexyl phenyl ketone and benzophenone) was added to each of the urethane resin compositions obtained in the examples and the comparative examples in an amount of 4 parts by mass per 100 parts by mass of the urethane resin present in the urethane resin composition. The urethane resin compositions were each applied to a thickness of 15 μm on a surface of a glass substrate. The coating was dried at 140° C. for 5 minutes and was then irradiated with UV radiation at a dose of 500 mJ/cm$^2$ in one pass using a high-pressure mercury lamp (GS Yuasa Corporation) to obtain an article having a coating on the surface of the glass substrate.

The hardness of the coating on the article was measured by a scratch hardness test (pencil test) according to JIS K-5600-5-4.

TABLE 1

|  |  | Example 1 | Example 2 | Example 3 | Example 4 | Example 5 | Example 6 |
|---|---|---|---|---|---|---|---|
| Urethane resin composition |  | (I) | (II) | (III) | (IV) | (V) | (VI) |
| Polycarbonate polyol | Parts by mass | 90 | 50 |  | 40 | 100 | 100 |
| Polyester polyol |  |  |  | 90 |  |  |  |
| 1,6-Hexanediol |  | 11.8 | 6.6 | 11.7 | 2.8 | 10.2 | 10.2 |
| 2,2-Dimethylolpropionic acid |  | 12.2 | 6.8 | 12 | 5.2 | 13.6 | 13.6 |
| Pentaerythritol diacrylate |  | 20.1 | 11.2 | 19.8 | 22 |  |  |
| 1,4-Bis(3-acryloyloxy-2-hydroxyproxy)butane |  |  |  |  |  | 35.6 | 35.6 |
| Dicyclohexylmethane diisocyanate |  | 97 | 53.9 | 95.6 | 49.8 | 107.8 | 107.8 |
| 10% by mass piperazine |  | 28.7 | 16 | 28.3 | 14.7 | 31.9 | 31.9 |
| Dipentaerythritol hexaacrylate |  |  | 12.8 |  | 12.1 |  | 27 |
| Double bond group content (mmol/g) |  | 0.70 | 1.55 | 0.70 | 2.27 | 0.70 | 1.55 |
| Elongation |  | Very good | Good | Very good | Fair | Very good | Good |
| Flexibility |  | Good | Good | Good | Good | Good | Good |
| Hardness |  | H | 2H | H | 3H | F | H |

TABLE 2

|  |  | Comparative Example 1 | Comparative Example 2 | Comparative Example 3 | Comparative Example 4 |
|---|---|---|---|---|---|
| Urethane resin composition |  | (I') | (II') | (III') | (IV') |
| Polyester polyol | Parts by mass | 100 | 100 | 100 | 138.8 |
| 1,6-Hexanediol |  | 10.6 | 21.2 | 8.2 |  |
| 2,2-Dimethylolpropionic acid |  | 13.4 | 13.9 | 15.4 | 29.9 |
| 2-Hydroxyethyl acrylate |  | 21.9 |  |  |  |
| Pentaerythritol triacrylate |  |  | 17.5 |  |  |
| Adduct of bisphenol A diglycidyl ether with acrylic acid |  |  |  | 73.4 | 212 |
| Dicyclohexylmethane diisocyanate |  | 106.3 | 106.3 | 122.6 | 369.1 |
| 10% by mass piperazine |  | 31.5 | 31.5 | 36.3 | 65 |
| Double bond group content (mmol/g) |  | 0.70 | 0.70 | 1.00 | 1.15 |
| Elongation |  | Very good | Good | Poor | Very poor |
| Flexibility |  | Good | Good | Good | Fair |
| Hardness |  | B | HB | H | 2H |

In Tables 1 and 2, "polycarbonate polyol" refers to a polycarbonate polyol obtained by reacting 1,6-hexanediol and 1,5-pentanediol with diethyl carbonate (number average molecular weight=2,000), and "polyester polyol" refers to a polyester polyol obtained by reacting 1,6-hexanediol and neopentyl glycol with adipic acid (number average molecular weight=2,000).

The invention claimed is:

1. A urethane resin composition comprising a urethane resin (A) having polymerizable unsaturated groups and an aqueous medium (B), the urethane resin (A) being obtained by reacting a polyol (a1) with a polyisocyanate (a2), the polyol (a1) comprising an oxyalkylenediol (a1-2) having two or more polymerizable unsaturated groups, the oxyalkylenediol (a1-2) being represented by general formula (2):

[Chem. 2]

HO—R¹O—R²—OR³—OH  (2)

(wherein $R^1$ and $R^3$ are ethylene groups having atomic groups comprising a polymerizable unsaturated group in side chains thereof, and $R^2$ is an alkylene group of one to five carbon atoms).

2. The urethane resin composition according to claim 1, wherein the oxyalkylenediol (a1-2) is present in a total amount of 0.1% to 49% of the total mass of the ingredients used to produce the urethane resin (A).

3. The urethane resin composition according to claim 1, wherein the polyol (a1) further comprises a polyester polyol, a polyether polyol, or a polycarbonate polyol.

4. A coating agent comprising the urethane resin composition according to claim 1.

5. An article coated with the coating agent according to claim 1.

* * * * *